US010093770B2

(12) United States Patent
Vidil et al.

(10) Patent No.: US 10,093,770 B2
(45) Date of Patent: Oct. 9, 2018

(54) SUPRAMOLECULAR INITIATOR FOR LATENT CATIONIC EPOXY POLYMERIZATION

(71) Applicants: Thomas Vidil, Paris (FR); Francois-Genes Tournilhac, Paris (FR); Ludwik Leibler, Paris (FR)

(72) Inventors: Thomas Vidil, Paris (FR); Francois-Genes Tournilhac, Paris (FR); Ludwik Leibler, Paris (FR)

(73) Assignees: SCHLUMBERGER TECHNOLOGY CORPORATION, Sugar Land, TX (US); FONDS DE L'ESPCI GEORGE CHARPAK, Paris (FR)

(*) Notice: Subject to any disclaimer, the term of this patent is extended or adjusted under 35 U.S.C. 154(b) by 0 days.

(21) Appl. No.: 13/964,878

(22) Filed: Aug. 12, 2013

(65) Prior Publication Data
US 2014/0088282 A1    Mar. 27, 2014

Related U.S. Application Data

(60) Provisional application No. 61/704,234, filed on Sep. 21, 2012.

(51) Int. Cl.
| C08G 59/72 | (2006.01) |
| C08K 5/06 | (2006.01) |
| C08G 59/68 | (2006.01) |
| C08L 63/00 | (2006.01) |
| C08L 101/00 | (2006.01) |
| B01J 31/00 | (2006.01) |

(52) U.S. Cl.
CPC .......... *C08G 59/72* (2013.01); *C08G 59/686* (2013.01)

(58) Field of Classification Search
CPC ..................................... C08G 59/72
USPC ....... 528/7, 4, 394, 91; 525/330.9; 264/45.9, 264/328.6
See application file for complete search history.

(56) References Cited

U.S. PATENT DOCUMENTS

| 3,170,516 A | 2/1965 | Holland et al. |
| 3,310,511 A | 3/1967 | Reinert |
| 3,385,367 A | 5/1968 | Kollsman |
| 3,449,278 A | 6/1969 | McKay et al. |
| 3,477,979 A | 11/1969 | Hillyer |

(Continued)

FOREIGN PATENT DOCUMENTS

| EP | 426427 | 12/1994 |
| JP | 06256483 | 9/1994 |

(Continued)

OTHER PUBLICATIONS

International Search Report and Written Opinion of PCT/US2013/060524 dated Nov. 26, 2013: pp. 1-11.

(Continued)

*Primary Examiner* — Duc Truong

(57) ABSTRACT

A mixture may include at least one polymerizable species and at least one thermoresponsive supramolecular initiator complex involving a host-guest interaction. Processes for making resins may include mixing at least one polymerizable species with at least one thermoresponsive supramolecular initiator complex involving a host-guest interaction; subjecting the mixture to a temperature above about 30° C. thereby promoting the dissociation of the at least one thermoresponsive supramolecular initiator; and allowing the mixture to cure at the temperature for a period of time.

25 Claims, 11 Drawing Sheets

(56) References Cited

U.S. PATENT DOCUMENTS

| | | |
|---|---|---|
| 3,525,398 A | 8/1970 | Fisher |
| 3,933,204 A | 1/1976 | Knapp |
| 3,960,801 A | 6/1976 | Cole et al. |
| 3,988,279 A | 10/1976 | Klassen |
| 4,113,015 A | 9/1978 | Meijs |
| 4,291,766 A | 9/1981 | Davies et al. |
| 4,669,543 A | 6/1987 | Young |
| 4,711,936 A | 12/1987 | Shibanai et al. |
| 4,936,386 A | 6/1990 | Colangelo |
| 5,314,023 A | 5/1994 | Dartez et al. |
| 5,423,381 A | 6/1995 | Surles et al. |
| 5,609,207 A | 3/1997 | Dewprashad et al. |
| 5,716,551 A | 2/1998 | Unruh et al. |
| 5,833,001 A | 11/1998 | Song et al. |
| 5,875,844 A | 3/1999 | Chatterji et al. |
| 5,875,845 A | 3/1999 | Chatterji et al. |
| 5,969,006 A | 10/1999 | Onan et al. |
| 6,012,524 A | 1/2000 | Chatterji et al. |
| 6,321,841 B1 | 11/2001 | Eoff et al. |
| 6,330,917 B2 | 12/2001 | Chatterji et al. |
| 6,350,309 B2 | 2/2002 | Chatterji et al. |
| 6,367,549 B1 | 4/2002 | Chatterji et al. |
| 6,802,375 B2 | 10/2004 | Bosma et al. |
| 7,007,755 B2 | 3/2006 | Reddy et al. |
| 7,287,586 B2 | 10/2007 | Everett et al. |
| 7,723,273 B1 | 5/2010 | Zaid et al. |
| 7,934,557 B2 | 5/2011 | Nguyen |
| 8,028,756 B2 | 10/2011 | Corre et al. |
| 8,051,914 B2 | 11/2011 | Freyer |
| 8,113,293 B2 | 2/2012 | Corre |
| 8,151,879 B2 | 4/2012 | Heller et al. |
| 8,490,707 B2 | 7/2013 | Robisson et al. |
| 8,993,491 B2 | 3/2015 | James et al. |
| 2006/0169455 A1 | 8/2006 | Everett et al. |
| 2008/0196897 A1 | 8/2008 | Nguyen |
| 2010/0282468 A1 | 11/2010 | Willberg et al. |
| 2011/0086942 A1 | 4/2011 | Robisson et al. |
| 2011/0207878 A1 | 8/2011 | Advincula |
| 2011/0220359 A1 | 9/2011 | Soliman et al. |
| 2013/0161006 A1 | 6/2013 | Robisson et al. |

FOREIGN PATENT DOCUMENTS

| | | |
|---|---|---|
| WO | 0194742 | 12/2001 |
| WO | 2005078235 | 8/2005 |
| WO | 2012060713 | 5/2012 |

OTHER PUBLICATIONS

International Search Report and Written Opinion of PCT/US2013/055663 dated Nov. 27, 2013: pp. 1-11.

Akutagawa et al., "Solid-State Molecular Rotators of Anilinium and Adamantylammonium in [Ni(dmit)2]—Salts with Diverse Magnetic Properties," Inorganic Chemistry, 2008, vol. 47(13): pp. 5951-5962.

Akutagawa et al., "Ferroelectricity and polarity control in solid-state flip-flop supramolecular rotators," Nature Materials, 2009, vol. 8: pp. 342-347.

Arasa et al., "Kinetic study by FTIR and DSC on the cationic curing of a DGEBA/γ-valerolactone mixture with ytterbium triflate as an initiator," Thermochimica Acta, 2008, vol. 479: pp. 37-44.

Atchekzai et al., "Catalytic curing agents," Polymer Bulletin, 1991, vol. 27: pp. 47-52.

Bonnetot et al., "Catalytic curing agents," Polymer Bulletin, 1996, vol. 37: pp. 655-662.

Bouillon et al., "Epoxy prepolymers cured with boron trifluoride-amine complexes, 1 Influence of the amine on the curing window," Makromol. Chem., 1990, vol. 191: pp. 1403-1416.

Bouillon et al., "Epoxy prepolymers cured with boron trifluoride-amine complexes, 2a) Polymerization mechanisms," Makromol. Chem., 1990, vol. 191: pp. 1417-1433.

Bouillon et al., "Epoxy prepolymers cured with boron trifluoride-amine complexes, 3a) Polymerization mechanisms of a prepolymer containing epoxy groups," Makromol. Chem., 1990, vol. 191: pp. 1435-1449.

Bounds et al., "Preparation and Application of Microparticles Prepared Via the Primary Amine-catalyzed Michael Addition of a Trithiol to a Triacrylate," Journal of Polymer Science Part A, Polymer Chemistry, 2012, vol. 50: pp. 409-422.

Bulut et al., "Investigation of the Reactivity of Epoxide Monomers in Photoinitiated Cationic Polymerization," Macromolecules, 2005, vol. 38: pp. 3584-3595.

Crivello, "Cationic Photopolymerization of Alkyl Glycidyl Ethers," Journal of Polymer Science: Part A: Polymer Chemistry, 2006: pp. 3036-3052.

Crivello, "Design and Synthesis of Multifunctional Glycidyl Ethers That Undergo Frontal Polymerization," Journal of Polymer Science: Part A: Polymer Chemistry, 2006: pp. 6435-6448.

Crivello, "9. Structure-reactivity relationships of epoxide monomers in photoinitiated cationic polymerization," Basics and Applications of Photopolymerization Reactions, 2010, vol. 2: pp. 101-117.

Crivello, "Redox Initiated Cationic Polymerization: The Unique Behavior of Alkyl Glycidyl Ethers," Journal of Polymer Science Part A: Polymer Chemistry, 2011, vol. 49: pp. 2147-2154.

Dong et al., "A Crown Ether Appended Super Gelator with Multiple Stimulus Responsiveness," Adv. Mater., 2012, vol. 24: pp. 3191-3195.

Döring et al., "Polymerization of epoxy resins initiated by metal complexes," Polym. Int., 2009, vol. 58: p. 976-988.

Fu et l., "4-Methoxyanilinium tetrafluoro-borate-dibenzo-18-crown-6 (1/1)," Acta Cryst., 2010, vol. C66: pp. o433-o435.

Fu et al., "Supramolecular Bola-Like Ferroelectric: 4-Methoxyanilinium Tetrafluoroborate-18-crown-6," Journal of the American Chemical Society, 2011, vol. 133: pp. 12780-12786.

Ge et al., "Responsive Supramolecular Gels Constructed by Crown Ether Based Molecular Recognition," Angew. Chem. Int. Ed., 2009, vol. 48: pp. 1798-1802.

Ghaemy, "The Polymerization Mechanism and Kinetics of Dgeba with BF3-EDA," Eur. Polym. J., 1998, vol. 34(8): pp. 1151-1156.

Ghosh et al., "Electron-beam curing of epoxy resins: effect of alcohols on cationic polymerization," Bull. Mater. Sci., Oct. 2005, vol. 28(6): pp. 603-607.

Harris et al., "Proposed Mechanism for the Curing of Epoxy Resins with Amine-Lewis Acid Complexes or Salts," Journal of Applied Polymer Science, 1966, vol. 10: pp. 523-533.

Matějka et al., "Cationic Polymerization of Diglycidyl Ether of Bisphenol A," Journal of Polymer Science: Part A, 1994, vol. 32: pp. 1447-1458.

Mortimer et al., "Rehological Behavior and Gel-Point Determination for a Model Lewis Acid-Initiated Chain Growth Epoxy Resin," Macromolecules, 2001, vol. 34(9): pp. 2973-2980.

Musto et al., "Tetrafunctional Epoxy Resins: Modeling the Curing Kinetics Based on FTIR Spectroscopy Data," Journal of Applied Polymer Sciences, 1999, vol. 74: pp. 532-540.

Park et al., "Effect of the Substituted Benzene Group on Thermal and Mechanical Properties of Epoxy Resins Initiated by Cationic Latent Catalysts," Journal of Polymer Science: Part B: Polymer Physics, 2004, vol. 42: pp. 2419-2429.

Poisson et al., "Near- and mid-infrared spectroscopy studies of an epoxy reactive system," Vibrational Spectroscopy, 1996, vol. 12: pp. 237-247.

Ryu et al., "Involvement of Supramolecular Complexes in the Capture and Release of Protonic Acids During the Cationic Ring-Opening Polymerization of Epoxides," Macromolecules, 2012, vol. 45: pp. 2233-2241.

Sarma et al., "Ammonium-crown ether based host-guest systems: N—H⋯O hydrogen bond directed guest inclusion featuring N—H donor functionalities in angular geometry," RSC Advances, 2012, vol. 2: pp. 3920-3926.

Shamsipur et al., "Complex Formation of Some Anilinium Ion Derivatives with 18-Crown-6, 1,10-diaza-18-crown-6 and Cryptand C222 in Acetonitrile, Dimethylformamide and their 1 : 1 Mixture,"

(56) References Cited

OTHER PUBLICATIONS

Journal of Inclusion Phenomena and Molecular Recognition in Chemistry, 1997, vol. 28: pp. 315-323.

Sipos et al., "Living ring-opening polymerization of L,L-lactide initiated with potassium t-butoxide and its 18-crown-6 complex," Polymer Bulletin, 1992, vol. 27: pp. 495-502.

Smith et al., "Epoxy Resin Cure, I. Fluorine-19 NMR of Boron Trifluoride Monoethylamine and Fluoriboric Acid," Journal of Applied Polymer Science, 1984, vol. 29: pp. 3697-3711.

Smith et al., "Epoxy Resin Cure, II. FTIR Analysis," Journal of Applied Polymer Science, 1984, vol. 29: pp. 3713-3726.

Tackie et al., "The Polymerization Mechanism and Kinetics of DGEBA with BF3-MEA," Journal of Applied Polymer Science, 1993, vol. 48: pp. 793-808.

Xu et al., "4-Chloroanilinium tetrafluoroborate 18-crown-6 clathrate", Acta Crystallographica, E68, o738, 2012, 7 pages.

Yagci, Y. et al., "Externally Stimulated Initiator Systems for Cationic Polymerization" Prog. Polym. Sci., vol. 23, 1998, 1485-1538.

Third Party Observation of corresponding Great Britain Application No. GB1504661.8 dated Aug. 19, 2016, 3 pp.

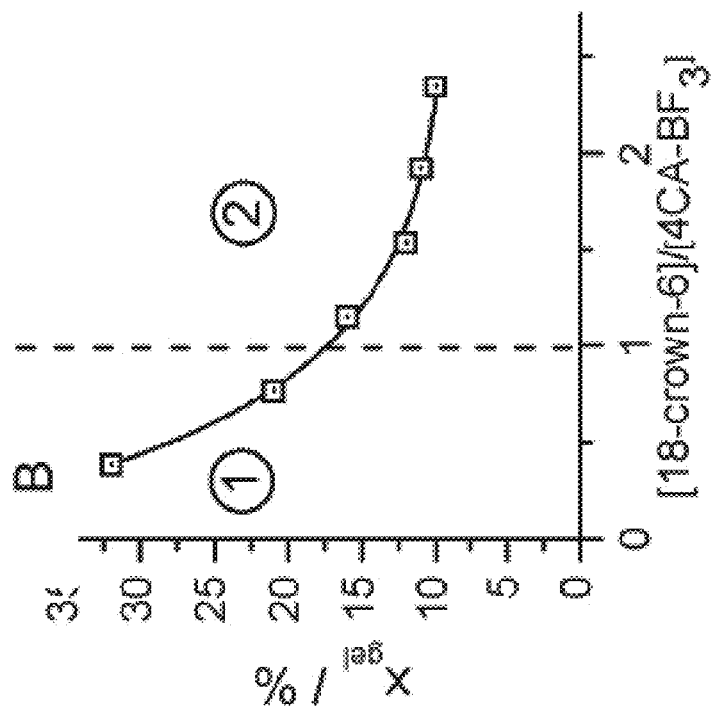
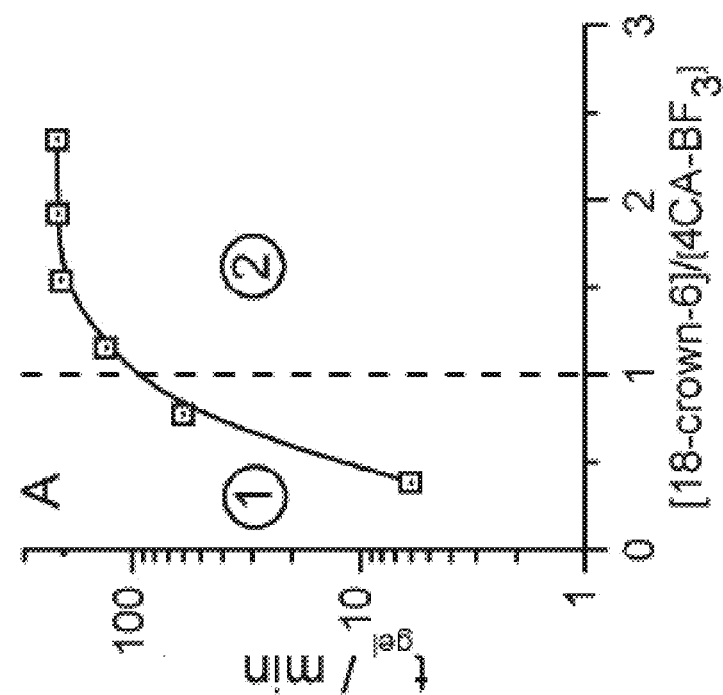
FIG. 8B
FIG. 8A

US 10,093,770 B2

SUPRAMOLECULAR INITIATOR FOR LATENT CATIONIC EPOXY POLYMERIZATION

CROSS-REFERENCE TO RELATED APPLICATIONS

This application claims the benefit of U.S. Provisional Patent Application Ser. No. 61/704,234 filed Sep. 21, 2012, which is herein incorporated by reference in its entirety.

BACKGROUND

Typical thermoset processing requires a pot life long enough to allow the preparation of a homogenous reaction mixture capable of being placed into a mold to react and form a desired morphology. Once in the mold, a fast cure is desired for the efficiency of production. Epoxy resins can be synthesized to exist as both low-viscosity liquids and high-melting solids, in addition to being formulated to possess desirable properties including: high strength, low-shrinkage, adherence to a variety of surfaces, electrical resistance, chemical resistance, low cost, and low toxicity. Cationic polymerization of epoxy pre-polymers to form higher molecular weight epoxy resins is a common method employed to make the useful thermoset materials.

Epoxy monomers comprise a three-membered ring consisting of one oxygen atom and two carbon atoms, commonly known as an epoxide group or oxirane ring. During the cure process of the cationic polymerization of epoxy monomers, at least one of the epoxide groups of the epoxy pre-polymer undergoes a ring-opening-polymerization process which begins through the action of an initiator. Due to the highly strained nature of the oxirane ring, a large amount of energy is released by the oxirane ring opening.

Lewis acids, including $SnCl_4$, $AlCl_3$, $BF_3$, and $TiCl_4$, are known initiators to start the cationic polymerization of epoxy resins. However, they react vigorously with the epoxy monomer causing the reaction to proceed at too fast of a rate making the reaction, and the product produced therefrom, difficult to control. $BF_3$-amine complexes are common alternative initiators to the lone Lewis acid initiators mentioned above. The nature of the amine in the complexes can be varied to facilitate the modulation of the curing rate and the production of epoxy polymers possessing excellent heat distortion temperature and electrical resistance.

Although the Lewis acid of the $BF_3$-amine complex can, in principle, initiate the cationic polymerization of the epoxy monomer through attack on the oxirane ring, it has been established that the true active initiator species is the superacid $HBF_4$, which is present in the form of an ammonium tetrafluoroborate in equilibrium with the superacid and the neutral amine. The ammonium tetrafluoroborate complex can be formed in the presence or absence of water and/or solvents. When water is present in excess relative to $HBF_4$, the latter behaves as a strong acid with the formation of hydronium ions, $H_3O^+$, which can also serve as a cationic polymerization initiator.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a mixture which may include at least one polymerizable resin and at least one thermoresponsive supramolecular initiator complex involving a host-guest interaction.

In another aspect, embodiments disclosed herein relate to a process for making a resin, which may include mixing at least one polymerizable resin with at least one thermoresponsive supramolecular initiator complex involving a host-guest interaction, subjecting the mixture to a temperature above about 30° C. thereby promoting the dissociation of the at least one thermoresponsive supramolecular initiator, and allowing the mixture to cure at the temperature for a period of time.

In yet another aspect, embodiments disclosed herein relate to a process for making a resin, which may include mixing at least one polymerizable species with at least one thermoresponsive supramolecular initiator complex involving a host-guest interaction; injecting the mixture into a mold; subjecting the mixture to a substantially constant temperature above about 30° C. thereby promoting the dissociation of the at least one thermoresponsive supramolecular initiator; and allowing the mixture to cure at the substantially constant temperature for a period of time.

Other aspects and advantages of the claimed subject matter will be apparent from the following description and the appended claims.

BRIEF DESCRIPTION OF DRAWINGS

FIGS. 8(a) and (b) shows the dependence of $t_{gel}$(min) and $x_{gel}$ (%), respectively, on the cationic ring opening polymerization cure of DGEBA initiated by 0.026 eq. $BF_3 \blacksquare 4CA$ in the presence of various concentrations of 18-crown-6 with a fixed concentration (0.061 eq.) of 1,4-butanediol.

DETAILED DESCRIPTION

Figure 1:
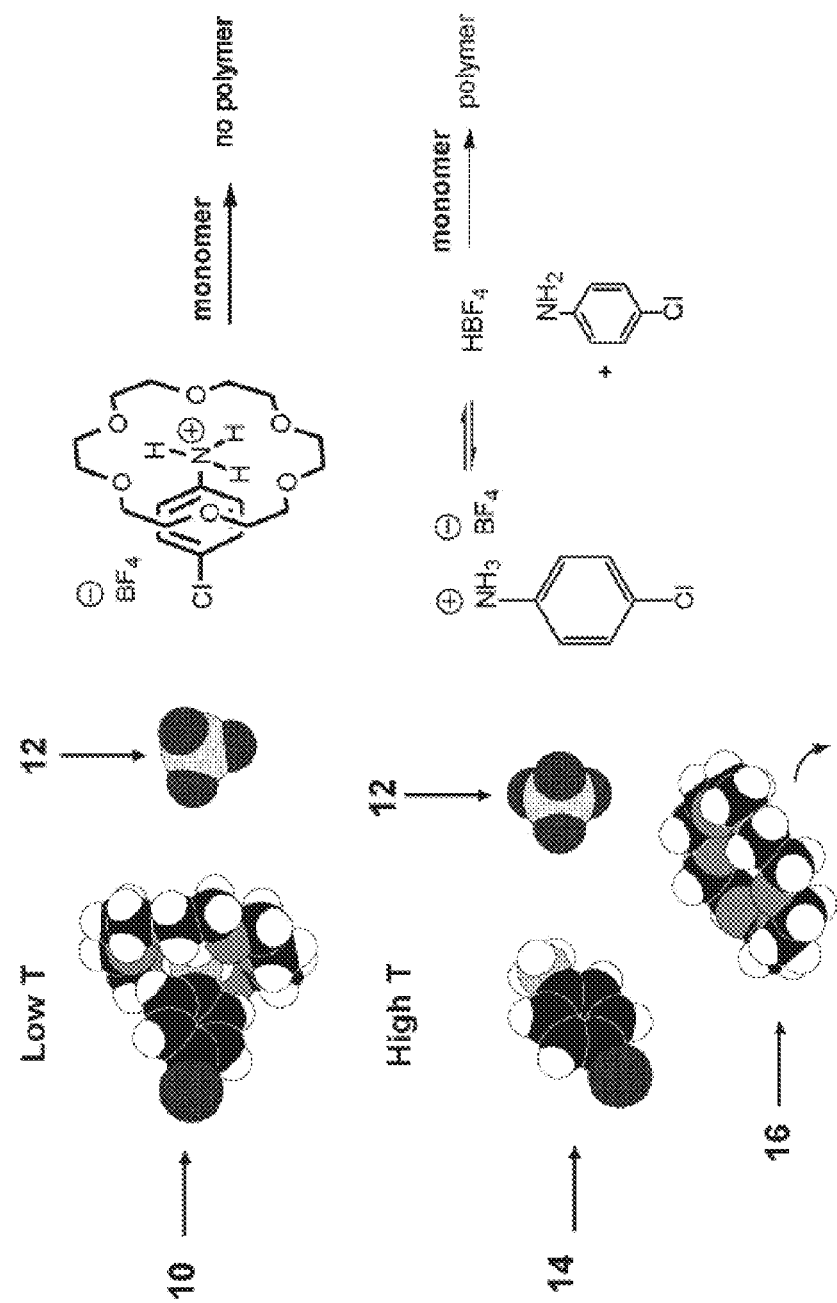
FIG. 1 shows one embodiment of a supramolecular initiator complex at low temperature, where the supramolecular initiator complex is intact, and at high temperature, where the complex dissociates to release the active initiator species.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

Embodiments of the present disclosure are related to supramolecular initiator complexes for latent cationic epoxy polymerization. Previous systems sequestered hydronium ions, which are secondary initiators and difficult to controllably produce through the actions of superacid species, to induce latency during cationic epoxy polymerization. Embodiments of the present disclosure induce latency during cationic polymerizations by sequestering the production of the true initiator, $HBF_4$, in standard $BF_3$-amine cured cationic polymerizations.

Thermoresponsive Supramolecular Initiator Complex

In one or more embodiments, the thermoresponsive supramolecular initiator complex is a complex involving a host-guest interaction between a cationic primary ammonium salt and a crown ether molecule in the presence of a tetrafluoroborate ion to form an ammonium tetrafluoroborate crown ether clathrate complex. Through crystallographic evidence, the host-guest interaction between a cationic primary ammonium salt and a crown ether molecule to form the clathrate complex has been shown to be stabilized through the formation of multiple hydrogen bonds between the primary ammonium cation and the negatively charged lone electron pairs located on the oxygen atoms of the crown ether molecule. A stable complex is capable of being formed in this way when the van der Waals diameter of the primary ammonium cation does not exceed a certain size which would lessen the strength of the hydrogen bonding interaction between the primary ammonium cation and the crown ether's corresponding negatively charged oxygens.

In one or more embodiments, the cationic primary ammonium salt may comprise a para and/or meta substituted aryl ammonium tetrafluoroborate salt. In more particular embodiments, the para and/or meta substitution of the aryl ammonium tetrafluoroborate salt may include a moiety and/or combination of moieties from the group including halogen, methoxy, hydroxyl, hydrogen, and alkyl chains. In even more particular embodiments, the cationic primary ammonium salt is 4-chloro-anilinium.

In one or more embodiments, the crown ether molecule may comprise benzo-18-crown-6, dibenzo-18-crown-6, (2,4)dibenzo-18-crown-6, cyclohexano-18-crown-6, cis-dicyclohexano-18-crown-6,4-carboxybenzyl-18-crown-6, nitrobenzo-18-crown-6, dinitrobenzo-18-crown-6, diaza-18-crown-6, bis(methoxymethyl)diaza-18-crown-6, Krypto fix 222 (4,7,13,16,21,24-hexaoxa-1,10-diazabicyclo(8.8.8)-hexacosane), or combinations thereof.

While the host-guest interaction between the primary ammonium cation and a crown ether molecule may produce a substantially stable complex at room temperature and ambient pressure, the hydrogen bonding interaction can be destabilized by heating the complex. With heating, an equilibrium is established between the host-guest complex and its dissociated components: the crown ether, and the tetrafluoroborate anion and the primary ammonium cation. Upon dissociation, the tetrafluoroborate anion and primary ammonium cation establish an equilibrium with the superacid $HBF_4$ (the true initiator) and the neutral amine.

FIG. 1 shows a schematic depicting the proposed mechanism behind using a thermoresponsive supramolecular initiator to induce latency during the cationic ring opening polymerization of a resin. While this is believed to be a valid mechanism, no restriction on the scope of the disclosure is intended by its incorporation. The upper half of the figure shows the state of the supramolecular initiator system at temperatures substantially below a point at which a majority of the supramolecular initiator complex 10 is dissociated. Shown in the upper half are space-filling models of both the supramolecular initiator complex 10 and the tetrafluoroborate anion 12 along with their traditional representations. With the primary ammonium cation complexed with the crown ether molecule in the supramolecular initiator complex 10, there is no initiator available to start the polymerization, and thus no polymer formed in the presence of available polymerizable species.

The lower half of FIG. 1 shows the state of the supramolecular initiator system at elevated temperatures (shifting the equilibrium towards dissociation of the supramolecular initiator complex). Under this condition, a majority of the supramolecular initiator complex 10 has dissociated into its components: the primary ammonium cation 14 and the crown ether molecule 16 along with the pre-existing tetrafluoroborate anion 12. As shown in the reaction scheme, the dissociation allows for the establishment of equilibrium between the primary ammonium cation 14/tetrafluoroborate anion 16 and the superacid $HBF_4$ and neutral amine. The superacid is then able to initiate the cationic ring opening polymerization of the polymerizable species to produce a resin.

Thus, latency can be induced in the reaction system up until a point where the complex resulting from the host-guest interaction between the primary ammonium cation and a crown ether molecule is dissociated, which allows for the creation of the true initiator, $HBF_4$.

One skilled in the art would appreciate that heating to destabilize the complex establishes an equilibrium between the complex and its components that is dependent upon the stability of the particular complex, the temperature, and any additives present in the mixture (such as transfer agents). For example, at a given temperature, a system utilizing a more stable complex will have a smaller percentage of the complex dissociated than a system utilizing a less stable complex. As shown in the Examples below, the stability of a particular complex may be measured as an activation energy (in kJ/mol) obtained through the use of the Arrhenius equation applied to gel point time ($t_{gel}$) as a function of reaction temperature. Therefore, upon knowing the activation energy and the desired application, an optimal temperature for the cationic ring opening polymerization cure can be arrived at to provide for a predictable timeframe to achieve gel point.

In one or more embodiments, the temperature used during the cationic ring opening polymerization may be at least 30° C., at least 50° C., at least 70° C., or at least 90° C. Further, in one or more embodiments, the percentage of the total amount of supramolecular initiator complex dissociated at such elevated temperature may be at least 10%, 25%, at least 50%, or at least 75%. Additionally, the use of the supramolecular initiator complex at a desired temperature may provide for the attainment of $t_{gel}$ in less than 400 minutes, less than 250 minutes, or less than 100 minutes.

In one or more embodiments, the polymerizable species may contain polymerizable monomers or prepolymers that polymerize through a cationic ring opening mechanism. As used herein, the term prepolymer refers to a monomer or system of monomers that has been reacted to an intermediate weight state (between monomer and polymer) but is still capable of further polymerization to a fully cured high-molecular weight state. In one or more embodiments, suitable monomers may be selected, for example, from one or more of heterocyclic monomers including lactones, lactams, cyclic amines, cyclic ethers, oxiranes, thietanes, tetrahydrofuran, dioxane, trioxane, oxazoline, 1,3-dioxepane, oxetan-2-one, and other monomers suitable for ring opening polymerization. In other embodiments, the polymerizable species may also be selected from one or more of an epoxy resin or diepoxide including, but not limited to trimethylolpropane triglycidyl ether, diglycidyl ether of neopentyl glycol, epoxidized 1,6-hexanediol, 1,4-butanediol diglycidyl ether (BD-DGE), 1,2,7,8-diepoxyoctane, 3-(bis(glycidoxymethyl)-methoxy)-1,2-propanediol, 1,4-cyclohexanedimethanol diglycidyl ether, 4-vinyl-1-cyclohexene diepoxide, 1,2,5,6-diepoxycyclooctane, and bisphenol A diglycidyl ether (DGEBA), and the like.

Other monomers that may be used in embodiments of the present disclosure include any monomer that polymerizes under cationic polymerization conditions including, but not limited to, olefins, alkenes, cycloalkenes, dienes, isobutenes, natural rubbers, unsaturated fatty acids, vinyl ketones, alkoxy alkenes, vinyl ethers, vinyl acetates, vinyl aromatics, styrene, and the like.

Figure 10:
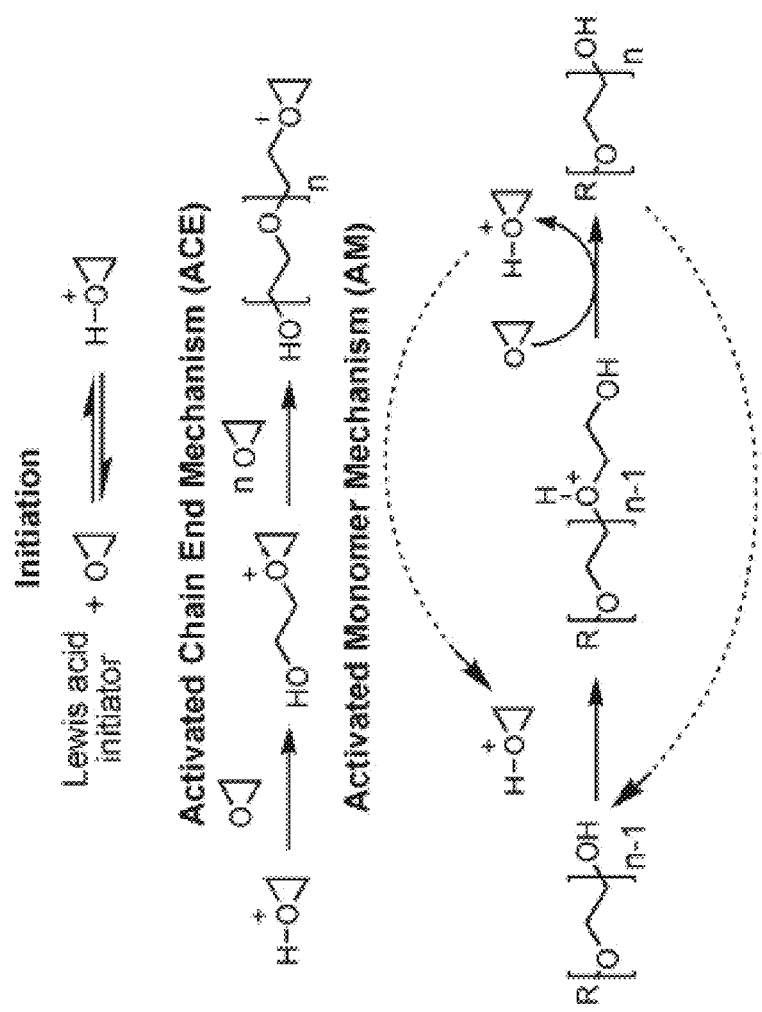
FIG. 10 shows mechanisms of the Lewis acid initiated cationic ring opening polymerization of epoxy.

In addition to monomers, in one or more embodiments, the initiator complex may also be provided with one or more transfer agents, which can further affect polymerization kinetics. Cationic polymerization of cyclic ethers can proceed following two distinct modes in competition (illustrated in FIG. 10): (1) a propagation mode called Activated Chain End (ACE) in which the chain growth involves the nucleophilic addition of monomer molecules onto the oxiranium carbon atom located at the end of the growing chain and (2) a propagation mode called Activated Monomer (AM) in which protonated monomers are attacked by hydroxylated chain ends. In this second propagation mode, each ring opening is followed by a proton transfer onto a new oxirane monomer which may in turn be opened by a hydroxyl chain end. The relative contribution of both modes generally depends on the ratio of epoxy monomer and hydroxyl concentrations, with AM propagation mode being more pronounced in the presence of hydroxylated transfer agents. Thus, use of a transfer agent that can be protonated may alter the kinetics of the polymerization reaction. In one or more particular embodiments, the transfer agent may be an alcohol (such as a diol) or an amine (such as a primary amine). No limit is placed on the diol molecules that may be utilized, although 1,4-butanediol, polyethylene glycol, polypropylene glycol, etc. may be used in one or more particular embodiments. Like the primary ammonium cation discussed above, a primary amine may be protonated and similarly trapped within the crown ether. Thus, types of amines that may be used include those similar to the amine used in the initiator complex, such as, for example, aromatic amines (and 4-chloroaniline, in particular).

Further, the amount of crown ether molecules added may be varied depending upon the desired characteristics of the cure and properties of the resulting polymer resin. In one or more embodiments, the amount of crown ether added may be less than, substantially equal to, or more than the molar equivalent amount of initiator (such as ■4CA or $BF_4^-$■$4CA^+$) added.

In general, at least one polymerizable species is mixed with the at least one thermoresponsive initiator complex involving a host-guest interaction and the temperature of the mixture is raised to at least above about 30° C. thereby promoting the dissociation of the at least one thermoresponsive supramolecular initiator and allowing the mixture to cure at elevated temperature for a period of time. In one or more embodiments, the temperature above about 30° C. may be substantially constant or may be variable, depending on the environment in which the polymer is being cured.

In yet another embodiment, the at least one polymerizable species may be mixed with the at least one thermoresponsive initiator complex involving a host-guest interaction and then injected into a pre-formed mold to finish the cure. In this case, the curing may result from the external conditions of the mold or from raising temperature of the mixture either before injection or after injection into the mold by any means known in the art.

EXAMPLES

Figure 2:
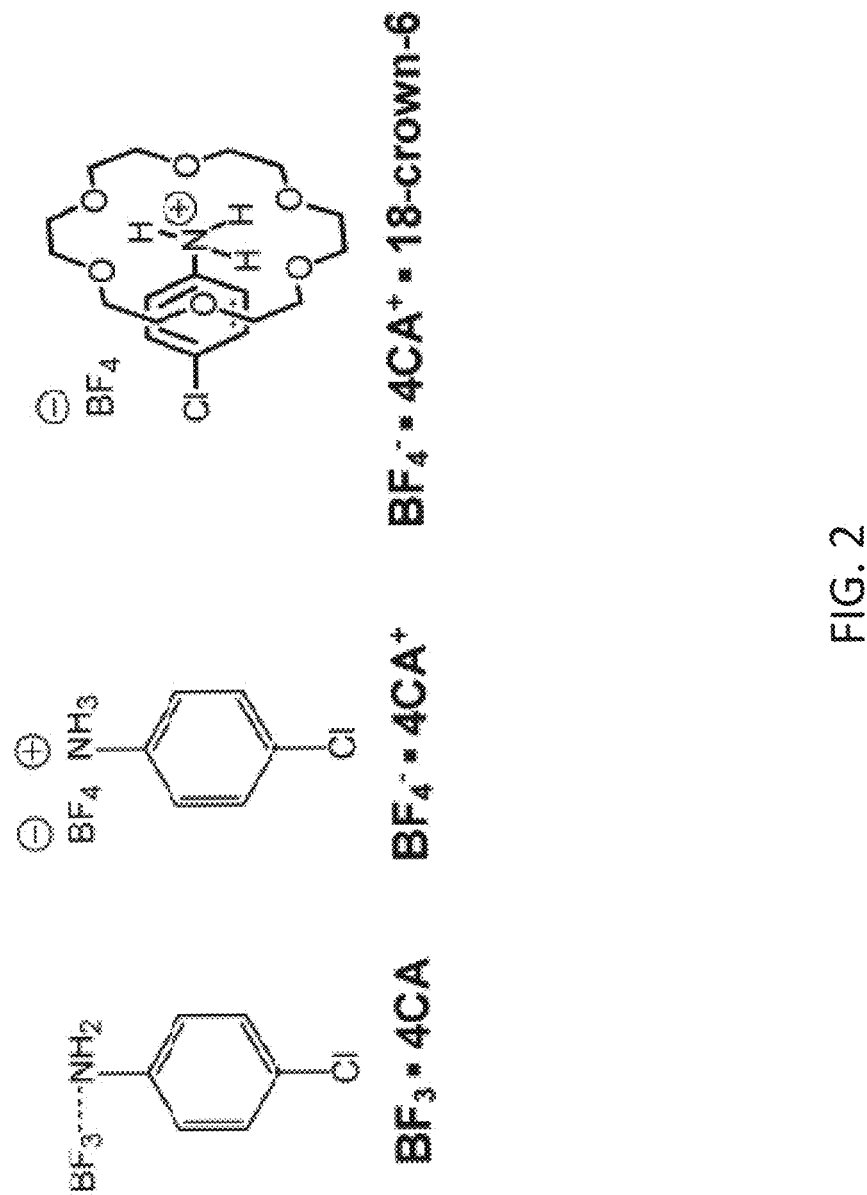
FIG. 2 shows the three fluoroborate complexes synthesized, isolated and tested in the cationic polymerization of DGEBA.

In order to show the efficacy of using a supramolecular initiator system for thermolatent initiation, three fluoroborate complexes are hereby synthesized, isolated, and tested in the cationic polymerization of DGEBA. The three complexes shown in FIG. 2 are i) a conventional cationic initiator for epoxies, the $BF_3$-amine complex between 4-chloro-anilinium (4CA) and boron trifluoride ($BF_3$) ii) the 4-chloro-anilinium ($4CA^+$) tetrafluoroborate ($BF_4^-$) salt which is considered to be the active form of the conventional $BF_3$-amine complex and iii) the supramolecular complex between 4-chloro-anilinium ($4CA^+$) and 18-crown-6 along with the tetrafluoroborate ($BF_4^-$) anion.

Measurement Methods

IR measurements—The isothermal curing process was monitored using a Bruker-Tensor 37 with a resolution of 4 cm$^{-1}$, equipped with a thermally controlled SPECAC Goldengate ATR accessory. The disappearance of the 914 cm$^{-1}$ absorbance peak (epoxy bending) was monitored to determine the epoxy conversion. The peak at 1605 cm$^{-1}$ (phenyl group) was chosen as an internal standard. Conversion was determined by the Lambert-Beer law from the normalized change of absorbance at 914 cm$^{-1}$:

$$\alpha_{\text{epoxy}} = 1 - \left(\frac{\overline{A}_{914}^t}{\overline{A}_{914}^0}\right)$$

where $\overline{A}_{914}{}^0 = A_{914}{}^0/A_{1605}{}^0$ and $\overline{A}_{914}{}^t = A_{914}{}^t/A_{1605}{}^t$ are the normalized absorbance of the epoxy groups before curing and after reaction time t, respectively.

Rheological Measurement—Rheological measurements under isothermal conditions were monitored using an Anton Paar Physica MCR 501 rheometer operating in the parallel plates geometry. The disposable plates were preheated in the rheometer environmental chamber for approximately 10 minutes at the set temperature before loading the samples. The gap between plates was fixed at 1 mm, and experiments were performed under oscillations at a frequency of 1 rad/s and a shear strain of 1%.

Throughout the examples the abbreviations $t_{vmax}$, $t_{gel}$, and $x_{gel}$ are used to denote characteristics of the cationically cured systems. Specifically, $t_{vmax}$ is the time required to reach the maximum reaction rate, measured as the time at the peak in the plot obtained by differentiating the epoxy conversion profile generated by the IR measurements. The gel point time ($t_{gel}$) is determined as the point of crossover of the storage modulus G' and the loss modulus G" measured during the rheological measurements. Conversion at gel point ($x_{gel}$) is taken as the epoxy conversion percent, which is measured by the IR measurements, at the gel point time.

Example 1

Figure 3B:
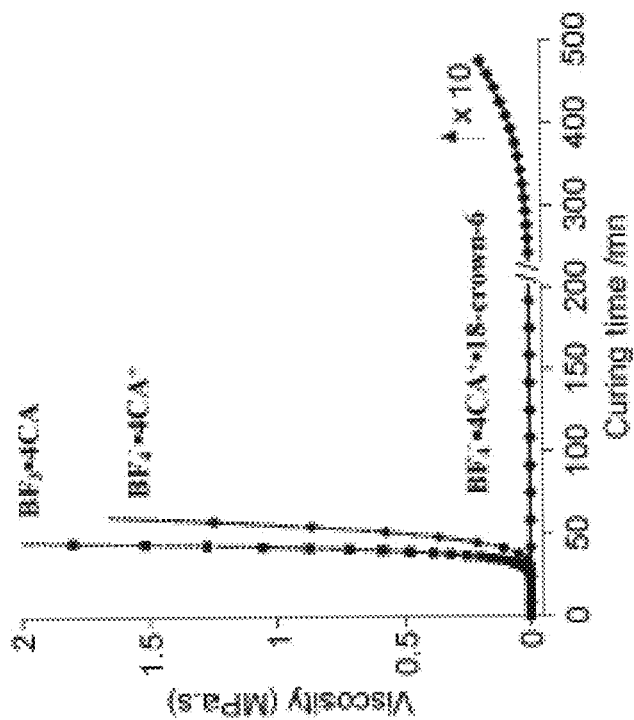
FIG. 3(b) show plots of the viscosity (measured by rheometry at 1 s$^{-1}$) during the cure, at 25° C., of DGEBA initiated by 0.026 eq. of the three fluoroborate complexes synthesized and isolated.
Figure 3A:
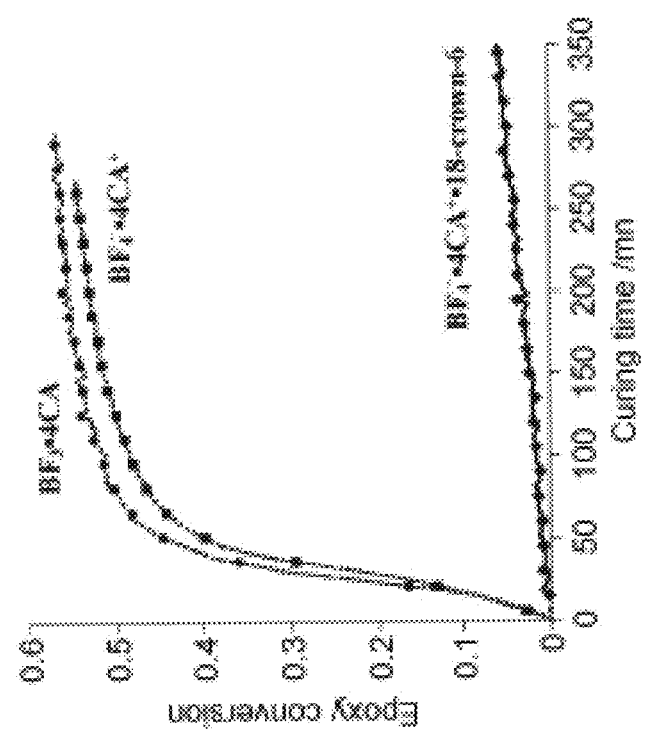
FIG. 3(a) shows plots of the time dependence of conversion (decay of IR-absorbance at 914 cm$^{-1}$) during the cure, at 25° C., of DGEBA initiated by 0.026 eq. of the three fluoroborate complexes synthesized and isolated.

In three separate reaction vessels, DGEBA was mixed with 0.026 equivalents (per epoxy) of one of $BF_3$■4CA, $BF_4^-$■$4CA^+$, or $BF_4^-$■$4CA^+$■18-crown-6. FIGS. 3a and 3b show the time dependence of the cure of DGEBA, initiated by the complexes at 25° C., in two ways: (1) as epoxy conversion measured by the decay of the IR absorbance band at 914 cm$^{-1}$ over time and (2) as viscosity change over time, respectively.

In the case of $BF_3$■4CA, the conversion rate reaches a plateau very quickly to about 50% conversion in a highly exothermic reaction. The rheological measurements show that the viscosity increases rapidly after about 50 minutes. In the case of the $BF_4^-$■$4CA^+$ salt, the epoxy conversion and viscosity measurements show a very similar behavior to the previous example. This result is consistent with the models proposed by several experts that $BF_3$-amine complexes initiate cationic ring opening polymerizations by their decomposition into the corresponding ammonium tetrafluoroborate salt which simultaneously and thereafter generates superacid $HBF_4$, the true initiator. The $BF_3$■4CA shows a slightly faster conversion rate and viscosification than the ammonium tetrafluoroborate salt indicating that $HBF_4$ is produced during the degradation of the $BF_3$-amine complex, prior to acid-base equilibration with the amine, and therefore is able to initiate the cationic ring opening polymerization earlier. In the case of the supramolecular complex $BF_4^-$■$4CA^+$■18-crown-6, during the same amount of time as the previous complexes there is no detectable evidence of initiation by either spectroscopy or rheometry. Only by recording the data on a much longer time scale (up to about 400 minutes) is the initiation observed. This result illustrates the ability to quench the formation of the active species, $HBF_4$, by trapping the ammonium species into a supramolecular complex with a crown ether molecule. As long as the ammonium is complexed by the crown ether, the initiator will have considerable latency.

Example 2

Figure 4B:
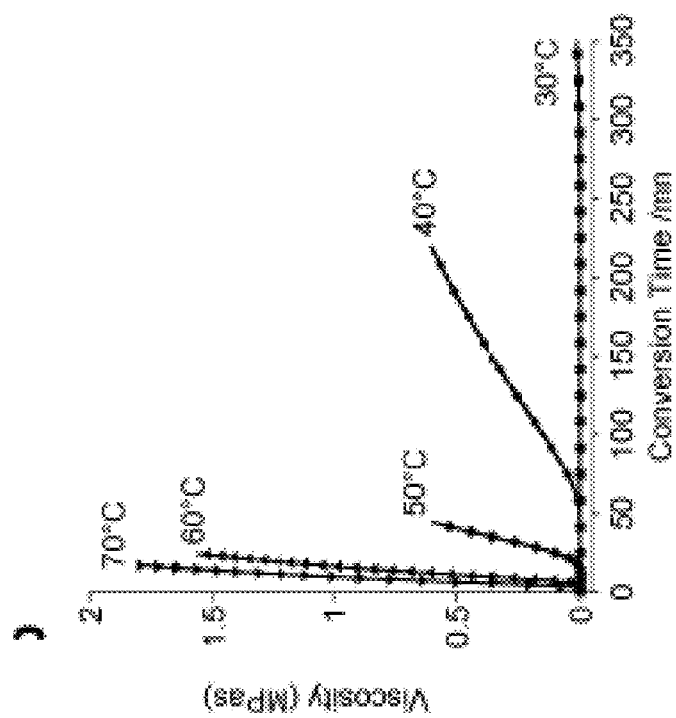
FIG. 4(b) shows plots of the time dependence of complex viscosity during the cationic polymerization of DGEBA initiated by 0.026 eq of $BF_4^-.4CA^+.18$-crown-6 at different temperatures.
Figure 4A:
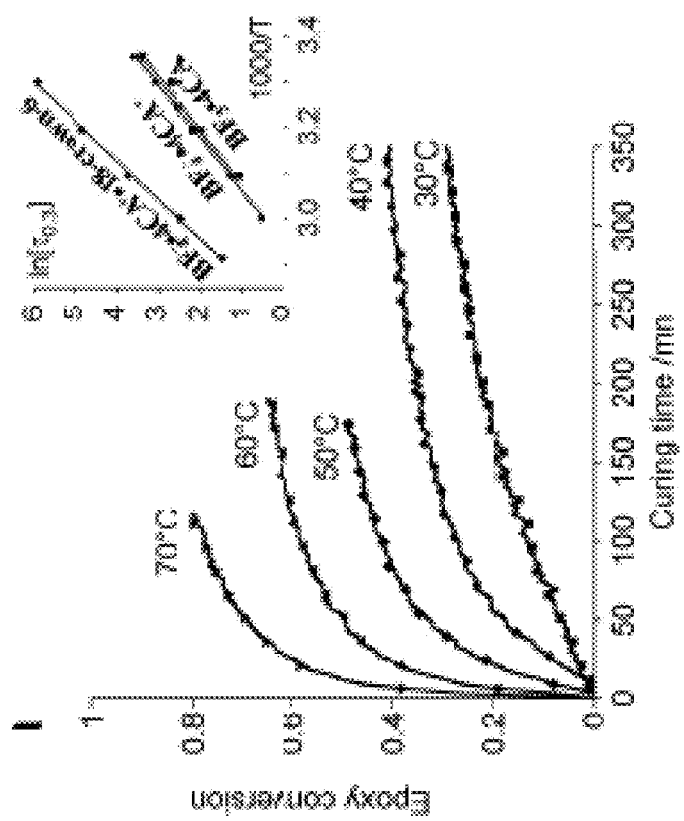
FIG. 4(a) shows plots of epoxy conversion during the cationic polymerization of DGEBA initiated by 0.026 eq. of $BF_4^-.4CA^+.18$-crown-6 at different temperatures.

DGEBA was mixed with 0.026 equivalents (per epoxy) of $BF_4^-$■$4CA^+$■18-crown-6. FIGS. 4a and 4b show the temperature dependence of the cationic polymerization cure of DGEBA initiated by $BF_4^-$■$4CA^+$■18-crown-6 in two ways: (1) as epoxy conversion measured by the decay of the IR absorbance band at 914 cm$^{-1}$ over time and (2) as viscosity change over time, respectively.

As mentioned above, the mode of complexing for the supramolecular initiator is through hydrogen bonds, and thus one can expect that as the temperature is increased the hydrogen bonding interactions will not be able to overcome the inherent increase in molecular motion, and the supramolecular complex will dissociate to release the ammonium, allowing for the production of the true initiator. As shown in FIGS. 4a and 4b, for temperatures equal or higher than 40° C., the effectiveness of the supramolecular initiator becomes measurable on a much shorter time scale than the previous example, on the order of one hour. In the rheological measurements there is a well marked difference of behaviors depending upon whether the curing temperature is above or below 40° C. The increase in temperature leads to disruption of the hydrogen bond based host-guest interaction of the supramolecular complex and the release of the weakly acidic ammonium cation, which in turn regenerates $HBF_4$, as shown in the bottom half of FIG. 1.

The G'/G" data (not shown) obtained from the same rheological measurements show that, at all temperatures, the gel point (cross of G' and G" traces) occurs for an epoxy conversion of about 30%. The gel time is related to the kinetic constant of the reaction, making it possible to extract the apparent activation energy from the knowledge of $\tau_{0.3}$, the time at 30% conversion. The inset of FIG. 4a shows the Arrhenius plots obtained by this method for the supramolecular initiator ($BF_4^-$■$4CA^+$■18-crown-6) and the classical initiator ($BF_3$■4CA). The slopes of these plots directly divulge the apparent activation energy for the ring opening cationic polymerization. In the case of $BF_3$■4CA, the activation energy is found to be 70 kJ/mol which is close to a previously reported value of 77 kJ/mol. In the case of $BF_4^-$■$4CA^+$■18-crown-6, a higher value of 97 kJ/mol is found. The higher activation energy is a direct consequence of the difference in stability between the two initiators. Indeed, both species act by generating $HBF_4$, which in turn initiates the same polymerization. The difference in the values of activation energies is thus directly related to the difference in the ease of generating $HBF_4$. Therefore, the 27 kJ/mol increase in activation energy resulting from the supramolecular initiator is a rough quantification of the gain of stability conferred by the crown ether to the $HBF_4$ generating species.

Example 3

Figure 5A:
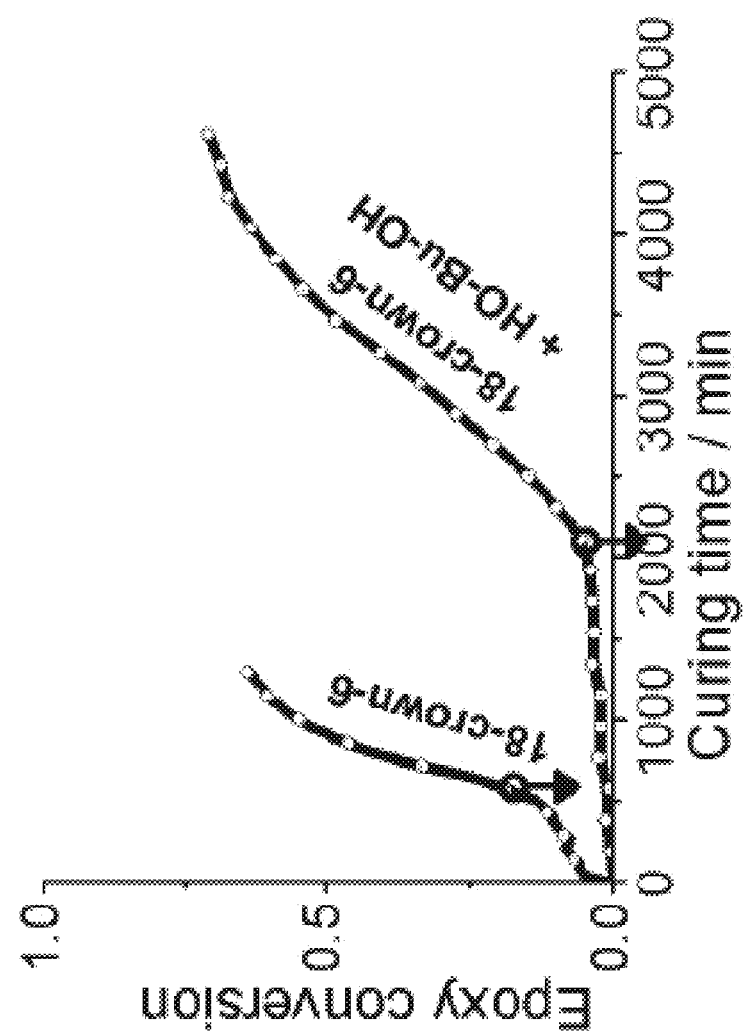
FIG. 5(a) shows plots of the epoxy conversion profile for the cationic ring opening polymerization cure of DGEBA at 40° C. initiated by $BF_3$■4CA in the presence of additives.
Figure 5B:
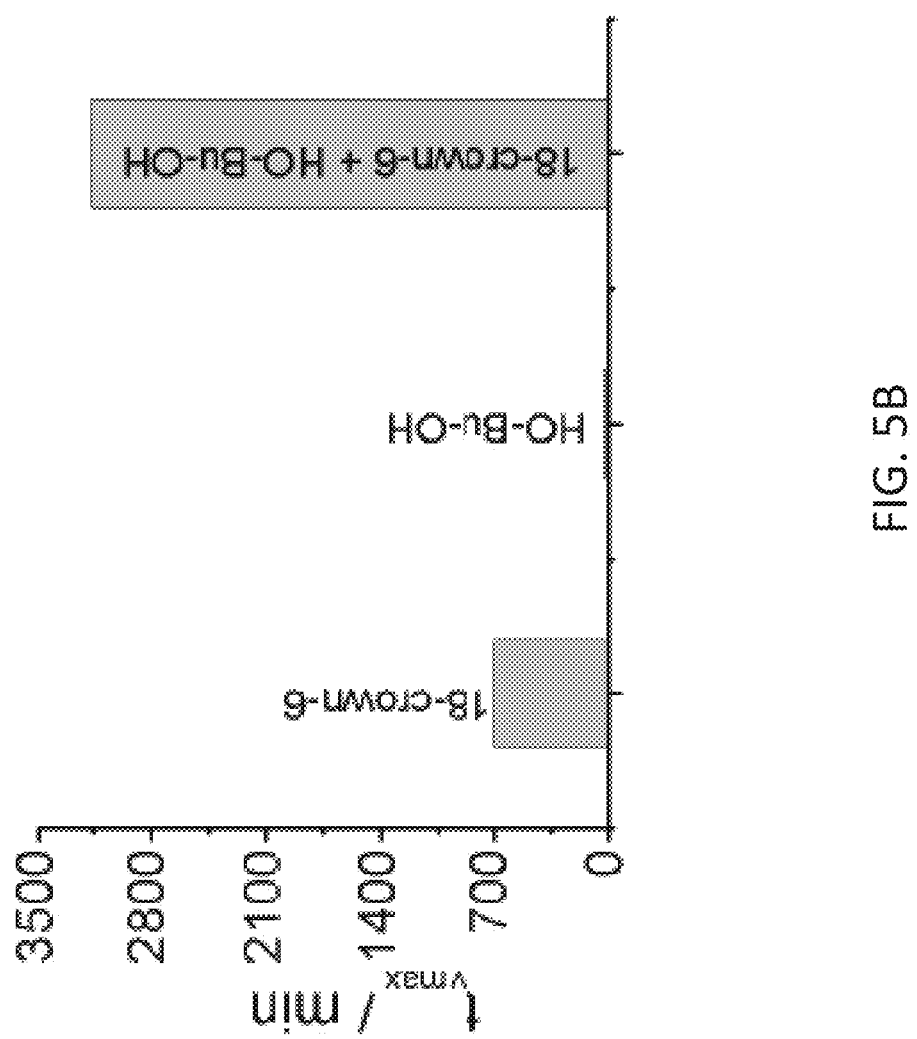
FIG. 5(b) shows plots of the kinetic parameter, $t_{vmax}$, for the cationic ring opening polymerization cure of DGEBA at 40° C. initiated by $BF_3$■4CA in the presence of additives.

DGEBA was mixed with 0.026 equivalents (per epoxy) of $BF_3$■4CA in the presence of additives: either 0.061 equivalents (per epoxy) 18-crown-6 or 1,4-butanediol, or in the presence of both 18-crown-6 and 1,4-butanediol at the concentration of 0.061 equivalents (per epoxy). FIGS. 5a and 5b show comparisons of the epoxy conversion profiles and kinetic parameter, $t_{vmax}$, for the cationic ring opening polymerization cure of DGEBA at 40° C. initiated by $BF_3$■4CA in the presence of the additives. Epoxy conversion and $t_{vmax}$ were both measured by the decay of the IR absorbance band at 914 cm$^{-1}$ over time.

Figure 6:
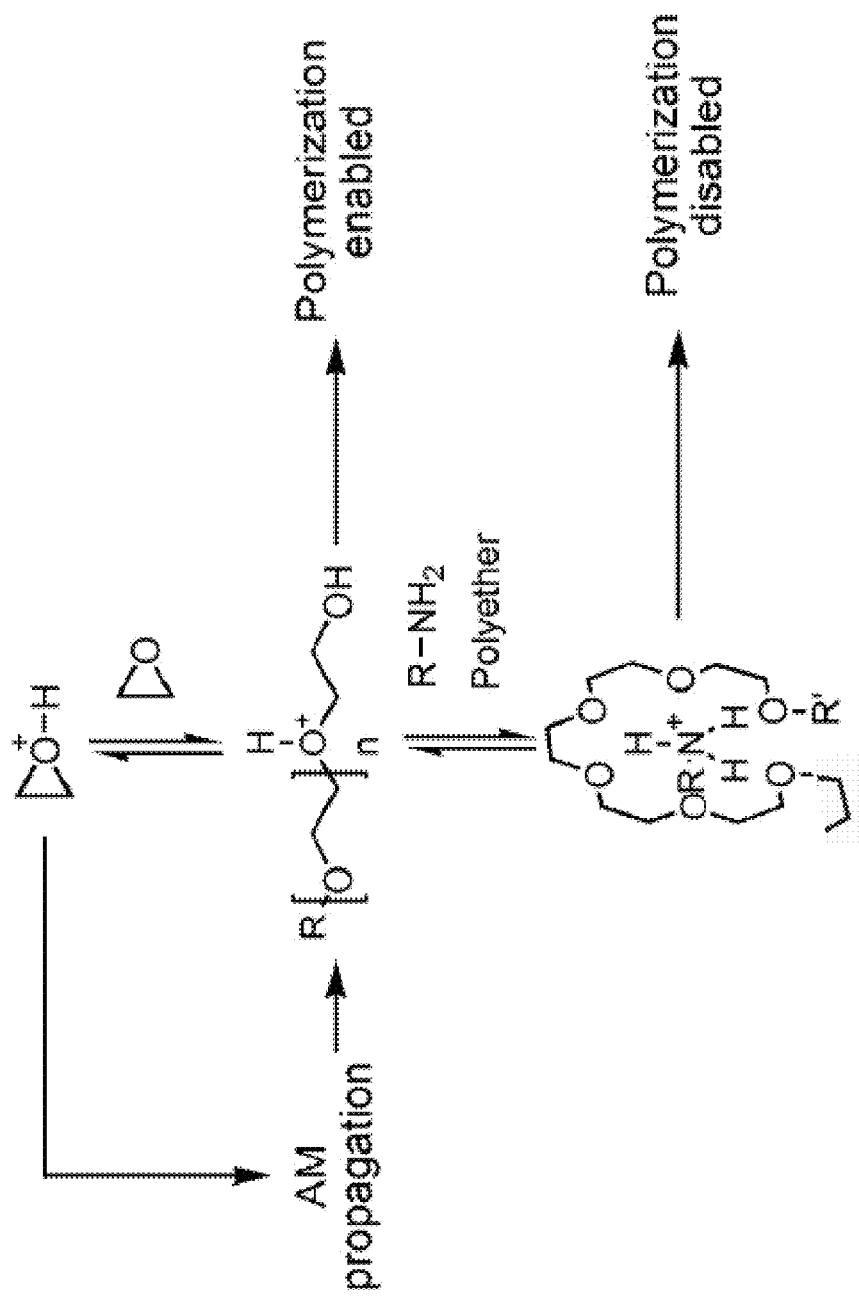
FIG. 6 shows the proposed proton exchange between different nucleophilic species present during the proposed Activated Monomer mechanism and the chelation of their acidic form by a polyether chain.

The results of this example, show that the epoxy conversion and $t_{vmax}$ values resulting from the combination of the two additives is not simply a superposition of the results from the additives alone, which indicates the existence of a strong synergy between the supramolecular complexation of cationic active species and the ability of diols to manipulate the polymerization to proceed through an activated monomer polymerization propagation mode, as opposed to an activated chain end mechanism. The results suggest that under the activated monomer polymerization propagation mode the influence of the crown ether's chelating ability towards positively charged species is increased. This can be interpreted, as shown in FIG. 6, by considering that activated monomer polymerization leads to permanent proton re-circulation whereby, before activating a new oxirane monomer, protons carried by the growing chains are involved in fast chemical equilibrium where they are rapidly exchanged between all the basic species present in the reaction mixture. In the present system, this can be molecules of aniline from the initiator. The anilinium thus produced by the protonation of aniline may exhibit a strong affinity to the 18-crown-6 which can trap these intermediates and thereby slow down the reaction. Again, while a discussion of the proposed mechanism is included, no restriction on the disclosure is intended.

Example 4

Figure 7B:
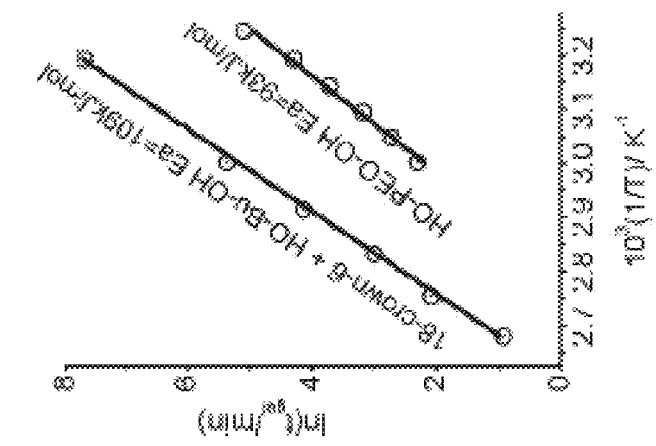
FIG. 7(b) shows Arrhenius plots of gel time as a function of reaction temperature for the cationic ring opening polymerization of DGEBA initiated by 0.026 eq. $BF_3 \blacksquare 4CA$ in the presence of 18-crown-6 and 1,4-butanediol at the same concentration (0.061 eq.) in comparison to the polymerization using the same initiator in the presence of a linear protic polyether, polyethylene glycol (0.061 eq.).
Figure 7A:
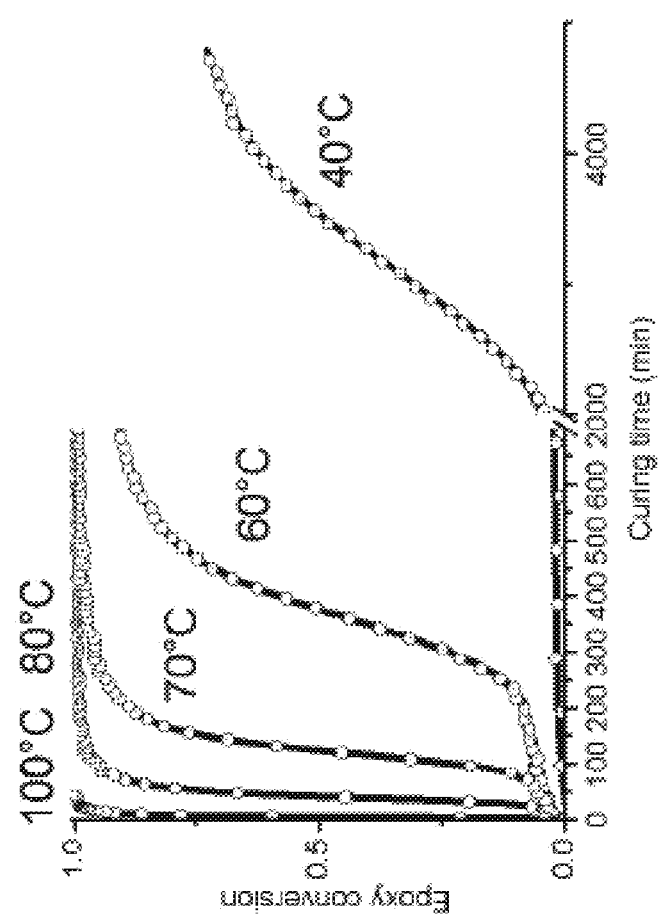
FIG. 7(a) shows plots of the conversion profile as a function of temperature for the cationic ring opening polymerization of DGEBA initiated by 0.026 eq. $BF_3$■4CA in the presence of 18-crown-6 and 1,4-butanediol at the same concentration (0.061 eq.).

DGEBA was mixed with 0.026 equivalents (per epoxy) of BF$_3$■4CA in the presence of both 18-crown-6 and 1,4-butanediol both at concentrations of 0.061 equivalents (per epoxy). FIG. 7a shows the temperature dependence of the cationic polymerization cure of DGEBA initiated by BF$_3$■4CA in the presence of both 18-crown-6 and 1,4-butanediol.

FIG. 7a shows that the stability of the supramolecular entities (the initial supramolecular initiator and the subsequent trapped intermediates discussed above), which contributes to the prolonged delay of the polymerization, is high even up to 60° C. where there is an induction period of more than 200 minutes. At 40° C. the induction period is shown to be about 2000 minutes. Indeed, the slope of the Arrhenius plot of the system, shown in FIG. 7b, gives an activation energy of 109 kJ/mol. This value represents an increase of 15 kJ/mol over the activation energy obtained using solely the linear polyether which displayed the longest induction period (polyethylene glycol 300 0.061 equivalents (per epoxy), 93 kJ/mol). Thus, 18-crown-6 used in combination with hydroxyl moieties presents an increase in activation energy when compared to the classical linear polyether. The difference in activation energy gives an estimation of the increase of affinity between protonated species and the polyether arising from a macrocyclic effect provided by the crown ether.

Example 5

DGEBA is mixed with 0.026 equivalents (per epoxy) of BF$_3$■4CA in the presence of both 18-crown-6 and 1,4-butanediol, at various concentrations of 18-crown-6 while keeping the concentration of 1,4-butanediol constant at 0.061 equivalents (per epoxy). FIG. 8 shows the dependence of $t_{gel}$(min) and $x_{gel}$ (%) on the cationic ring opening polymerization cure of DGEBA initiated by BF$_3$■4CA in the presence of various concentrations of 18-crown-6 with a fixed concentration of 1,4-butanediol.

As shown in FIG. 8, two regions can be distinguished depending on whether the concentration of 18-crown-6 is more or less than the concentration of the initiator. At lower concentrations of 18-crown-6 compared to the initiator, the cure resembles the characteristic features of growing networks following the activated monomer propagation mode by yielding larger $x_{gel}$ values, with the $t_{gel}$ time rapidly increasing with increasing 18-crown-6 concentration. As soon as the 18-crown-6 concentration slightly exceeds the initiator concentration (vertical dashed lines on FIGS. 8a and 8b), $t_{gel}$ stabilizes and $x_{gel}$ drops to values between 10-16%.

This result can be understood as the initiator concentration fixes the total concentration of protons able to create active protic sites which promote growing epoxy chains. Thus, when the concentration of the 18-crown-6 exceeds the concentration of the initiator, the vast majority of the active protic sites are trapped through protonated species involved in supramolecular equilibrium. Only a few growing chains are initiated, in proportion to the probability that a circulating proton will protonate an oxirane rather than be captured by another basic species and then trapped in the form of a supramolecular intermediate. Further, once a growing chain is initiated, the two propagation modes are in competition and the activated chain end propagation mode is favored over the activated monomer even in the presence of hydroxyl, as the activated monomer mechanism is severely slowed by the trapping of the re-circulating protons, needed to continue chain growth, in a supramolecular intermediate by the 18-crown-6.

When the 18-crown-6 concentration is lower than the initiator concentration, the number of crown ether molecules is not sufficient to capture all of the protic active sites and thus at each instant some of the active sites are free to participate in the epoxy polymerization. Additionally, in the presence of the diol, and with an insufficient amount of crown ether to capture the re-circulating protons, the epoxy polymerization will largely proceed through the activated monomer mechanism leading to higher critical conversion values ($x_{gel}$).

Example 6

Figure 9:
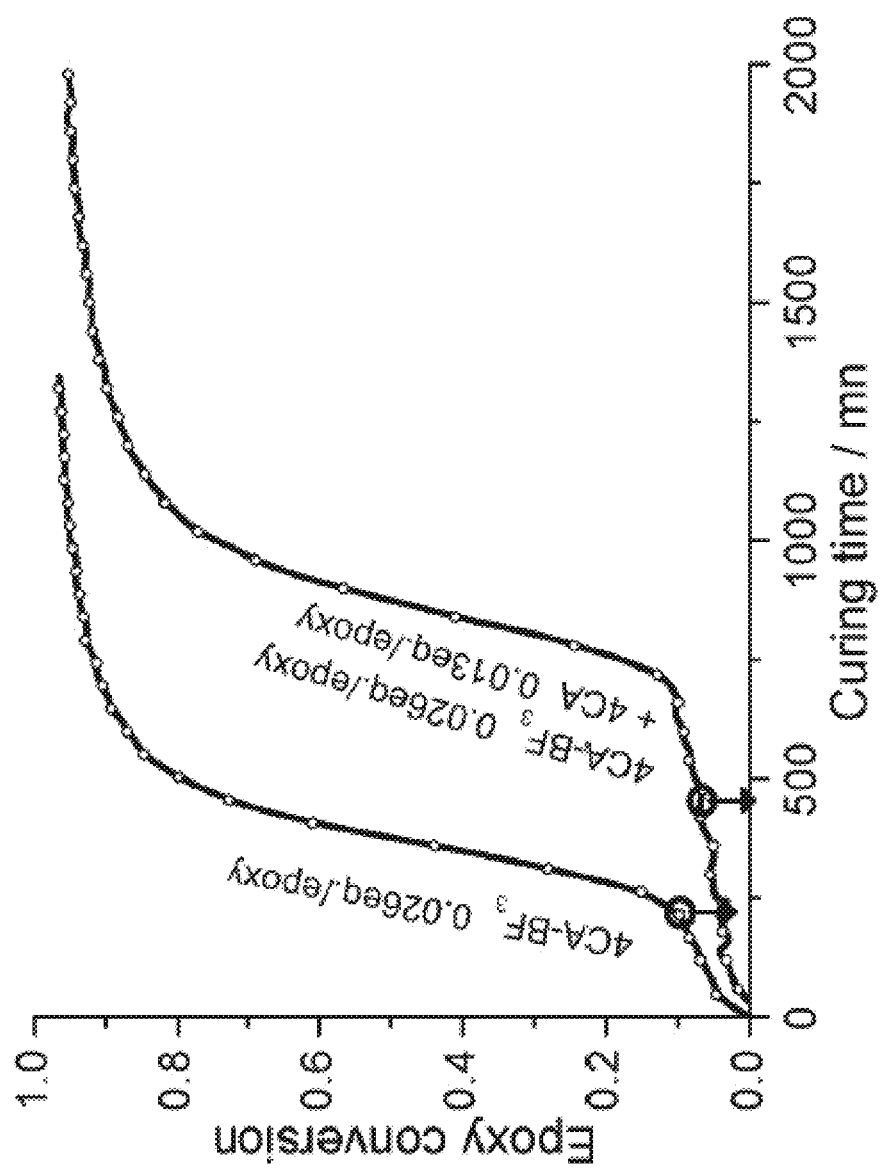
FIG. 9 shows the epoxy conversion profile of the cationic ring opening polymerization cure of DGEBA initiated by 0.026 eq. $BF_3 \blacksquare 4CA$ in the presence of 0.061 eq. of 1,4-butanediol and 18-crown-6 and in the presence or absence of 0.013 eq. of 4-chloroaniline.

DGEBA is mixed with 0.026 equivalents (per epoxy) of BF$_3$■4CA and 0.061 equivalent (per epoxy) of 1,4-butanediol and 0.061 equivalent (per epoxy) of 18-crown-6. The curing is conducted at 60° C. in the absence or the presence of 0.013 equivalent (per epoxy) of 4-chloroaniline. FIG. 9 shows the time dependance of the epoxy conversion in both cases and the gel time is indicated by vertical arrows. It is evident that the addition of 4-chloroaniline permits to induce a long induction time resulting in increased values of $t_{gel}$ and $t_{vmax}$.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed:

1. A mixture, comprising:
   at least one polymerizable species; and
   at least one thermoresponsive supramolecular initiator complex involving a cyclic or polycyclic polyether and a hydrogen bond donor reactive species linked by a host-guest interaction, and
   wherein disrupting the host-guest interaction initiates the polymerization of the at least one polymerizable species.

2. The mixture of claim 1, wherein the host-guest interaction is between a cationic primary ammonium salt and a crown ether molecule.

3. The mixture of claim 2, wherein the cationic primary ammonium salt is a para and/or meta substituted aryl ammonium tetrafluoroborate salt.

4. The mixture of claim 3, wherein the para and/or meta substitution of the aryl ammonium tetrafluoroborate salt is a halogen, methoxy, hydroxy, hydrogen, alkyl chain, or combinations thereof.

5. The mixture of claim 2, wherein the crown ether molecule is benzo-18-crown-6, dibenzo-18-crown-6, (2,4)dibenzo-18-crown-6, cyclohexano-18-crown-6, cis-dicyclohexano-18-crown-6,4-carboxybenzyl-18-crown-6, nitrobenzo-18-crown-6, dinitrobenzo-18-crown-6, diaza-18-crown-6, bis(methoxymethyl)diaza-18-crown-6, Kryptofix 222 (4,7,13,16,21,24-hexaoxa-1,10-diazabicyclo(8.8.8)-hexacosane), or combinations thereof.

6. The mixture of claim 1, wherein the at least one thermoresponsive supramolecular initiator complex is an ammonium tetrafluoroborate crown ether clathrate.

7. The mixture of claim 6, wherein the ammonium tetrafluoroborate crown ether clathrate is 4-chloro-anilinium tetrafluoroborate 18-crown-6 complex.

8. The mixture of claim 1, wherein the at least one polymerizable species comprises a polymerizable monomer or prepolymer that polymerizes through a cationic ring opening mechanism.

9. The mixture of claim 8, wherein the polymerizable monomer comprises one or more of a heterocyclic monomer including lactones, lactams, cyclic amines, cyclic ethers, oxiranes, thietanes, tetrahydrofuran, dioxane, trioxane, oxazoline, 1,3-dioxepane, oxetan-2-one, and other monomers suitable for ring opening polymerization.

10. The mixture of claim 1, wherein the at least one polymerizable species is one or more of an epoxy resin or diepoxide including trimethylolpropane triglycidyl ether, diglycidyl ether of neopentyl glycol, epoxidized 1,6-hexanediol, 1,4-butanediol diglycidyl ether (BDDGE), 1,2,7,8-diepoxyoctane, 3-(bis(glycidoxymethyl)-methoxy)-1,2-propanediol, 1,4-cyclohexanedimethanol diglycidyl ether, 4-vinyl-1-cyclohexene diepoxide, 1,2,5,6-diepoxycyclooctane, and bisphenol A diglycidyl ether (DGEBA).

11. The mixture of claim 1, further comprising at least one diol molecule.

12. The mixture of claim 1, further comprising at least one primary amine molecule.

13. A process for making a resin, comprising:
    mixing at least one polymerizable species with at least one thermoresponsive supramolecular initiator complex involving a cyclic or polycyclic polyether and a hydrogen bond donor reactive species linked by a host-guest interaction, and
    wherein disrupting the host-guest interaction initiates the polymerization of the at least one polymerizable species;
    subjecting the mixture to a temperature above about 30° C., thereby promoting the dissociation of the at least one thermoresponsive supramolecular initiator; and
    allowing the mixture to cure at the temperature for a period of time.

14. The process for making a resin of claim 13, wherein the at least one thermoresponsive supramolecular initiator complex is at least one complex involving a host-guest interaction between a cationic primary ammonium salt and a crown ether molecule.

15. The process for making a resin of claim 14, wherein the cationic primary ammonium salt is a para and/or meta substituted aryl ammonium tetrafluoroborate salt.

16. The process for making a resin of claim 15, wherein the para and/or meta substitution of the aryl ammonium tetrafluoroborate salt is a halogen, methoxy, hydroxy, hydrogen, alkyl chain, or combinations thereof.

17. The process for making a resin of claim 14, wherein the crown ether molecule is benzo-18-crown-6, dibenzo-18-crown-6, (2,4)dibenzo-18-crown-6, cyclohexano-18-crown-6, cis-dicyclohexano-18-crown-6,4-carboxybenzyl-18-crown-6, nitrobenzo-18-crown-6, dinitrobenzo-18-crown-6, diaza-18-crown-6, bis(methoxymethyl)diaza-18-crown-6, Kryptofix 222 (4,7,13,16,21,24-hexaoxa-1,10-diazabicyclo (8.8.8)-hexacosane), or combinations thereof.

18. The process for making a resin of claim 13, wherein the thermoresponsive supramolecular initiator complex is an ammonium tetrafluoroborate crown ether clathrate.

19. The process for making a resin of claim 18, wherein the ammonium tetrafluoroborate crown ether clathrate is 4-chloro-anilinium tetrafluoroborate 18-crown-6 complex.

20. The process for making a resin of claim 13, wherein the at least one polymerizable species comprises a polymerizable monomer or prepolymer that polymerizes through a cationic ring opening mechanism.

21. The process for making a resin of claim 20, wherein the polymerizable monomer comprises one or more of a heterocyclic monomer including lactones, lactams, cyclic amines, cyclic ethers, oxiranes, thietanes, tetrahydrofuran, dioxane, trioxane, oxazoline, 1,3-dioxepane, oxetan-2-one, and other monomers suitable for ring opening polymerization.

22. The process for making a resin of claim 13, wherein the at least one polymerizable species is one or more of an epoxy resin or diepoxide including trimethylolpropane triglycidyl ether, diglycidyl ether of neopentyl glycol, epoxidized 1,6-hexanediol, 1,4-butanediol diglycidyl ether (BDDGE), 1,2,7,8-diepoxyoctane, 3-(bis(glycidoxymethyl)-methoxy)-1,2-propanediol, 1,4-cyclohexanedimethanol diglycidyl ether, 4-vinyl-1-cyclohexene diepoxide, 1,2,5,6-diepoxycyclooctane, and bisphenol A diglycidyl ether (DGEBA).

23. The process for making a resin of claim 13, further comprising: adding at least one diol and/or primary amine molecule during the mixing of the polymerizable resin and the thermoresponsive supramolecular initiator complex.

24. A process for making a resin, comprising:
    mixing at least one polymerizable species with at least one thermoresponsive supramolecular initiator complex involving a cyclic or polycyclic polyether and a hydrogen bond donor reactive species linked by a host-guest interaction, and
    wherein disrupting the host-guest interaction initiates the polymerization of the at least one polymerizable species;
    injecting the mixture into a mold; and
    allowing the mixture to cure for a period of time.

25. The process for making a resin of claim 24, further comprising
    subjecting the mixture to a substantially constant temperature above about 30° C. thereby promoting the dissociation of the at least one thermoresponsive supramolecular initiator and allowing the mixture to cure at the substantially constant temperature for a period of time.

* * * * *